(12) United States Patent
Lee et al.

(10) Patent No.: US 10,311,693 B1
(45) Date of Patent: Jun. 4, 2019

(54) VEHICLE AND A METHOD FOR CONTROLLING THE SAME

(71) Applicants: HYUNDAI MOTOR COMPANY, Seoul (KR); KIA MOTORS CORPORATION, Seoul (KR)

(72) Inventors: Jeong Kee Lee, Seoul (KR); Youngkee Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/818,359

(22) Filed: Nov. 20, 2017

(51) Int. Cl.
  *G08B 21/02* (2006.01)
  *B60Q 5/00* (2006.01)
  *B60Q 1/50* (2006.01)
  *B60N 2/00* (2006.01)

(52) U.S. Cl.
  CPC ......... *G08B 21/0283* (2013.01); *B60N 2/002* (2013.01); *B60Q 1/50* (2013.01); *B60Q 5/005* (2013.01)

(58) Field of Classification Search
  CPC ...... G08B 21/0283; B60N 2/002; B60Q 1/50; B60Q 5/005
  See application file for complete search history.

(56) References Cited

U.S. PATENT DOCUMENTS

| | | | | |
|---|---|---|---|---|
| 2002/0145516 | A1* | 10/2002 | Moskowitz | B60H 1/00742 340/522 |
| 2003/0122662 | A1* | 7/2003 | Quinonez | B60N 2/002 340/457 |
| 2004/0113797 | A1* | 6/2004 | Osborne | B60N 2/002 340/573.4 |
| 2012/0050021 | A1* | 3/2012 | Rao | B60N 2/002 340/425.5 |
| 2016/0144781 | A1* | 5/2016 | Kleinert | B60Q 9/00 701/36 |
| 2017/0043783 | A1* | 2/2017 | Shaw | B60H 1/00978 |
| 2017/0116839 | A1* | 4/2017 | Friedman | G08B 21/0283 |

* cited by examiner

*Primary Examiner* — Sisay Yacob
(74) *Attorney, Agent, or Firm* — Lempia Summerfield Katz LLC

(57) ABSTRACT

A vehicle and a method for controlling the vehicle include generating a warning message for passenger confirmation such that a driver of the vehicle confirms whether at least one passenger safely alights from the vehicle by recognizing the warning message. The method for controlling the vehicle includes: primarily confirming a presence or absence of a passenger having not yet exited the vehicle on a basis of opening/closing information of doors; generating a primary warning message for passenger confirmation on a basis of a result of the primary confirmation regarding the presence or absence of the passenger; secondarily confirming the presence or absence of the passenger having not yet exited the vehicle using a human detection sensor; and generating a secondary warning message for passenger confirmation on a basis of a result of the secondary confirmation.

18 Claims, 6 Drawing Sheets

FIG. 6

VEHICLE AND A METHOD FOR CONTROLLING THE SAME

BACKGROUND

1. Field

The present disclosure relates to a vehicle, and more particularly to a safety feature that informs a driver whether a passenger remains in a vehicle when the vehicle is parked.

2. Description of the Related Art

A vehicle generally includes front seats (i.e., first-row seats) and back seats (including second-row seats and/or third-row seats). Among various types of vehicles, a coupe-type vehicle may include only front seats (front-row seats).

When an adult accompanied by a toddler, an infant, or a child rides in the vehicle, it is desirable that toddlers, infants, or children are seated on the back seats of the vehicle for safety.

However, when the adult driving the vehicle arrives at a destination, parks the vehicle in a parking lot, and alights from the vehicle, the adult may park the vehicle without recognizing whether passengers seated on the back seats (or a first-row passenger seat) have safely exited the vehicle. In some cases, the passengers of the back seats may be unintentionally and unfortunately left behind or remaining in the vehicle by the adult by mistake.

SUMMARY

Therefore, it is an aspect of the present disclosure to provide a vehicle configured to generate a warning message for passenger confirmation such that a driver of the vehicle may confirm whether at least one passenger safely alights from the vehicle by recognizing the warning message.

Additional aspects of the disclosure are set forth in part in the description which follows, in part, will be understood from the description, or may be learned by practice of the disclosure.

In accordance with an aspect of the present disclosure, a method for controlling a vehicle includes: primarily confirming a presence or absence of a passenger having not yet exited the vehicle on a basis of opening/closing information of doors; generating a primary warning message for passenger confirmation on a basis of a result of the primary confirmation regarding the presence or absence of the passenger; secondarily confirming the presence or absence of the passenger having not yet exited the vehicle using a human detection sensor; and generating a secondary warning message for passenger confirmation on a basis of a result of the secondary confirmation.

When the primary warning message is generated, maintenance or cancellation of the secondary warning message may be selected, and generation or non-generation of the secondary warning message may be decided according to the selection result of the maintenance or cancellation of the secondary warning message.

The generating the secondary warning message may include, when the presence of the passenger having not yet exited the vehicle is repeatedly detected a predetermined number of times within a predetermined time after a driver of the vehicle exits the vehicle, generating the secondary warning message.

The method may further include, when the secondary warning message is generated in a daytime, generating the secondary warning message using audible warning and also using visual warning. The method may also include, when the secondary warning message is generated in a nighttime, generating the secondary warning message only using the visual warning.

The visual warning may include blinking an emergency lamp of the vehicle. The audible warning may include honking a horn of the vehicle.

The human detection sensor may include at least one of a motion sensor, a weight sensor, and a pressure sensor configured to detect the presence or absence of the passenger remaining in the vehicle.

The motion sensor may include at least one of an ultrasonic sensor, an infrared sensor, a vision sensor, a radar sensor, and a LiDAR (Light Detection And Ranging) sensor.

The secondary warning message may include transmitting a message for passenger confirmation to a mobile device of a driver of the vehicle.

In accordance with another aspect of the present disclosure, a vehicle includes: a door switch configured to detect opening or closing of a door of the vehicle; a human detection sensor configured to detect a presence or absence of a human body; and a controller configured to generate a primary warning message according to a passenger confirmation result based on the opening or closing information of the door and generate a secondary warning message according to a passenger confirmation result detected by the human detection sensor.

When the primary warning message is generated, maintenance or cancellation of the secondary warning message may be selected, and generation or non-generation of the secondary warning message may be decided according to the selection result of the maintenance or cancellation of the secondary warning message.

The secondary warning message may be generated when the presence of the passenger having not yet exited the vehicle is repeatedly detected a predetermined number of times within a predetermined time after a driver of the vehicle exits the vehicle.

When the secondary warning message is generated in a daytime, the controller may generate the secondary warning message using audible warning and also using visual warning. When the secondary warning message is generated in a nighttime, the controller may generate the secondary warning message only using the visual warning.

The visual warning may include blinking an emergency lamp of the vehicle. The audible warning may include honking a horn of the vehicle.

The human detection sensor may include at least one of a motion sensor, a weight sensor, and a pressure sensor configured to detect the presence or absence of the passenger remaining in the vehicle.

The motion sensor may include at least one of an ultrasonic sensor, an infrared sensor, a vision sensor, a radar sensor, and a LiDAR (Light Detection And Ranging) sensor.

The secondary warning message may transmit a message for passenger confirmation to a mobile device of a driver of the vehicle.

In accordance with another aspect of the present disclosure, a method for controlling a vehicle includes confirming a presence or absence of a passenger having not yet exited the vehicle using a human detection sensor and generating a warning message for passenger confirmation on a basis of the confirmation result regarding the presence or absence of the passenger.

The generating the warning message for passenger confirmation may include, when the presence of the passenger having not yet exited the vehicle is repeatedly detected a predetermined number of times within a predetermined time after a driver of the vehicle exits the vehicle, generating the warning message.

The method may further include, when the warning message is generated in a daytime, generating the warning message using audible warning and also using visual warning. The method may also include, when the warning message is generated in a nighttime, generating the warning message only using the visual warning.

The visual warning may include blinking an emergency lamp of the vehicle. The audible warning includes honking a horn of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference is made in detail to the embodiments of the present disclosure, examples of which are illustrated in the accompanying drawings, wherein like reference numerals refer to like elements throughout.

Figure 1:
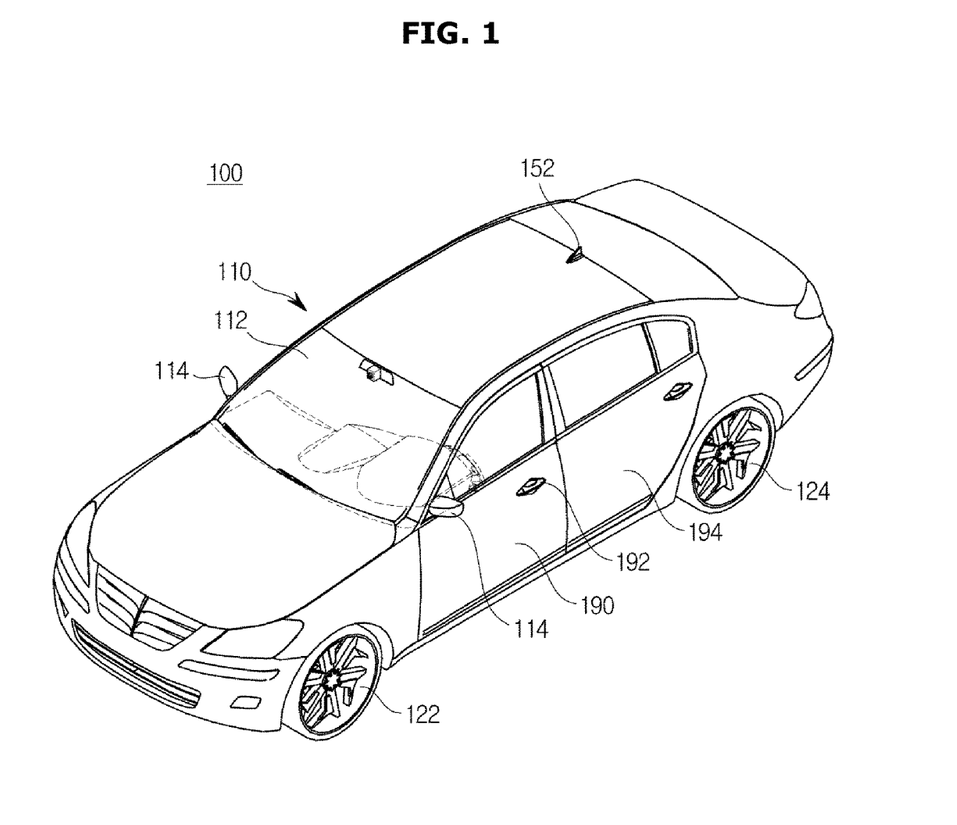
FIG. 1 is a view illustrating a vehicle according to an embodiment of the present disclosure.

FIG. 1 is a view illustrating a vehicle according to an embodiment of the present disclosure. Referring to FIG. 1, the vehicle 100 may have the following structures.

A windshield 112 arranged at a front upper portion of a main body 110 may provide a forward view of the vehicle 100 to a vehicle driver who rides in the vehicle 100, and may protect the vehicle driver from the wind. Side-view mirrors 114 may include a left side-view mirror provided at the left of the main body 110 and a right side-view mirror provided at the right of the main body 110. The driver who rides in the vehicle 100 may obtain visual information of the lateral and rear directions of the vehicle through the side-view mirrors 114. A single left side-view mirror is mounted to a left door 190, and a single right side-view mirror is mounted to a right door 190.

The doors 190 and 194 may be rotatably mounted to the left and right sides of the main body 110. A driver and passenger may easily ride in or leave the vehicle through the doors 190 and 194. The doors 190 and 194 may be classified into front doors (also called front-seat doors) 190 and rear doors (also called back-seat doors) 194.

An antenna 152 may receive broadcast/communication signals, for example, telematics signal, DMB signal, digital TV signal, GPS signal, and the like. The antenna 152 may be a multi-functional antenna configured to receive various kinds of broadcast/communication signals, or may be a single functional antenna configured to receive any one of broadcast/communication signals.

Front wheels 122 may be provided at the front of the vehicle 100 and rear wheels 124 may be provided at the rear of the vehicle 100. The front wheels 122 and the rear wheels 124 may receive drive power from an engine (not shown), so that the front wheels 122 and the rear wheels 124 may rotate.

Figure 2:
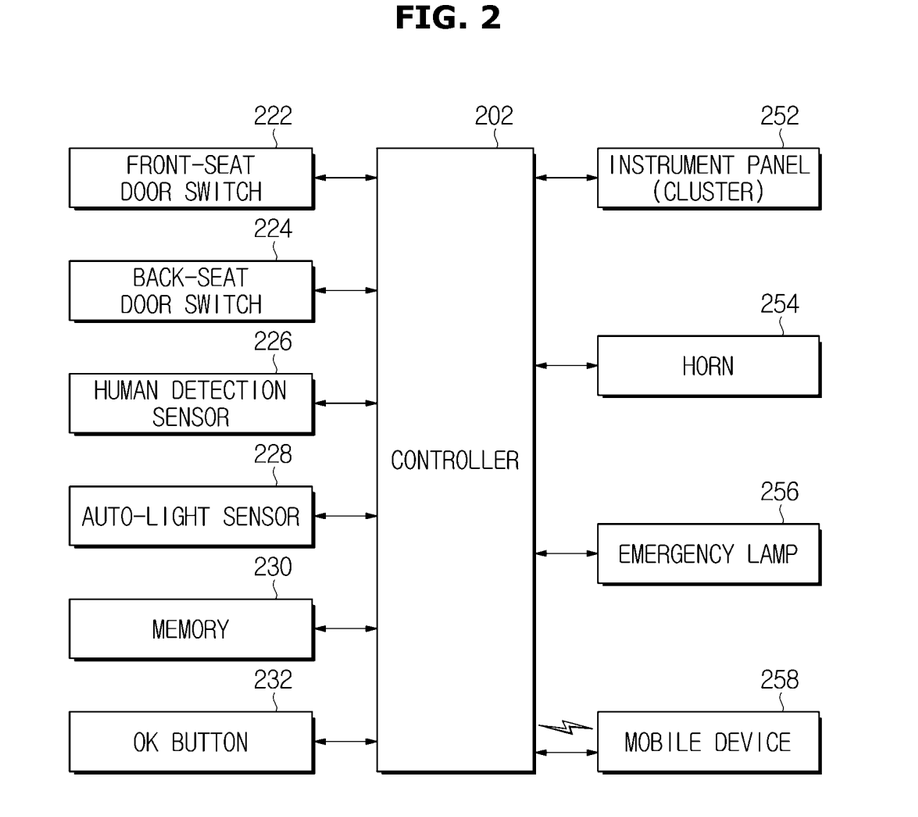
FIG. 2 is a block diagram illustrating an apparatus for generating a warning message for passenger confirmation in a vehicle according to an embodiment of the present disclosure.

FIG. 2 is a block diagram illustrating an apparatus for generating a warning message for passenger confirmation in the vehicle according to an embodiment of the present disclosure.

Referring to FIG. 2, a controller 202 may control an overall process for controlling the vehicle 100 to generate a warning message for passenger confirmation. The controller 202 may be a microprocessor or an electronic control unit (ECU). The controller 202 may generate a primary warning message for passenger confirmation or a secondary warning message for passenger confirmation according to the presence or absence of at least one passenger other than a driver in the vehicle 100, thereby arousing the driver's attention. In some instances, the controller 202 may be configured to generate only the secondary warning message.

A front-seat door switch 222 may detect opening or closing of at least one of the front-seat doors 190 of the vehicle 100. For example, when any one of the front-seat doors 190 is opened, the front-seat door switch 222 may be turned on (and vice versa). When any one of the front-seat doors 190 is closed, the front-seat door switch 222 may be turned off (and vice versa). The opening/closing information of the front-seat doors 190 detected by the front-seat door switch 222 may be stored in a memory 230, as described below. The controller 202 may determine whether any front-seat passenger enters or exits the vehicle upon receiving the opening/closing information of the front-seat doors 190 from the memory 230. The controller 202 also may determine the presence or absence of any residual, i.e., other or additional passenger remaining in the front seat of the vehicle 100.

A back-seat door switch 224 may detect opening or closing of at least one of the back-seat doors 194 of the vehicle 100. For example, when any one of the back-seat doors 194 is opened, the back-seat door switch 224 may be turned on (and vice versa). When any one of the back-seat doors 194 is closed, the back-seat door switch 224 may be turned off (and vice versa). The opening/closing information of the back-seat doors 194 detected by the back-seat door switch 224 may be stored in a memory 230, also described below. The controller 202 may determine whether any back-seat passenger enters or exits the vehicle upon receiving the opening/closing information of the back-seat doors 194 from the memory 230. The controller 202 also may determine the presence or absence of any residual passenger remaining in the back seat of the vehicle 100.

A human detection sensor 226 may detect the presence or absence of a residual passenger who has not yet exited the vehicle 100. The result detected by the human detection sensor 226 may be stored in the memory 230. The above-mentioned method for confirming the presence or absence of passengers remaining in the vehicle 100 uses the detection results of the door switches 222 and 224. The above-mentioned method may be an indirect confirmation method based on the opening/closing information of the doors 190 and 194, such that there is a possibility of causing a wrong result different from the actual entrance/exit result of the passengers. In contrast, a confirmation method for detecting the presence or absence of passengers using the human detection sensor 226 is a direct confirmation method for directly detecting the presence or absence of passengers remaining in the vehicle 100. Thus, the direct confirmation method may have a higher reliability in the detection result of passengers as compared to the indirect confirmation method. The human detection sensor 226 may detect the presence or absence of a residual passenger who has not yet exited the vehicle 100. For example, the human detection sensor 226 may be implemented as a motion sensor. In other words, the human detection sensor 226 may detect movement of a residual passenger remaining in the vehicle 100 using the motion sensor. For example, the motion sensor may be implemented using at least one of an ultrasonic sensor, an infrared sensor, a vision sensor (camera), a short-range radar sensor, and a short-range LiDAR (Light Detection And Ranging) sensor. As another example of the human detection sensor 226, a weight sensor may be used. That is, the weight sensor (or pressure sensor) installed in each seat of the vehicle 100 may measure the weight of each passenger or pressure produced by seating of the passenger.

An auto-light sensor 228 may be an illumination sensor configured to detect illumination intensity of a peripheral region of the vehicle 100. When the vehicle 100 is in an auto-light mode, headlights of the vehicle 100 may be automatically turned on or off according to illumination intensity of the peripheral region detected by the auto-light sensor 228. For example, when illumination intensity detected by the auto-light sensor 228 is less than a reference illumination intensity during nighttime driving or tunnel driving of the vehicle 100, headlights may be automatically turned on. In contrast, when the illumination intensity detected by the auto-light sensor 228 is equal to or higher than the reference illumination intensity during daytime driving of the vehicle 100, headlights may be automatically turned off. For this purpose, a predetermined reference illumination intensity for operating the auto-light mode may be established in the controller 202, such that headlights may be turned on or off according to the reference illumination intensity. The reference illumination intensity may be used as a reference for making a distinction between a daytime condition and a nighttime condition. The reference may be used to decide how to generate a secondary warning message for warning the driver of the presence or absence of a residual passenger who has not yet exited the vehicle 100.

The memory 230 may store various kinds of data and information needed to generate a warning message for confirming the presence or absence of any passenger remaining in the vehicle 100. For example, the memory 230 may store not only information related to the opening/closing actions of the doors 190 and 194, but also the result detected by the human detection sensor 226.

An OK button 232 may be used as an example of one of the constituent elements of a user interface (UI) mounted to the vehicle 100. The OK button 232 may allow the driver to select an option menu needed for manipulation of the vehicle 100, or may allow the driver to answer in the affirmative to a request from the controller 202. For example, when the controller 202 asks the driver whether to maintain or cancel a secondary warning message, the driver may decide whether to maintain or cancel the secondary warning message and then confirm the decision using the OK button 232.

An instrument panel 252 may be located at the front of a driver seat of the vehicle 100, and may display various kinds of information indicating a current state of the vehicle 100. The instrument panel 252 of the vehicle 100 may display various messages related to warning for passenger confirmation.

A horn 254 may be provided to generate a sound signal having a predetermined volume level so as to attract the attention of the departed driver, other vehicles, or pedestrians. The vehicle 100 according to an embodiment of the present disclosure may use the horn 254 to generate a warning message for passenger confirmation.

An emergency lamp 256 may include a left-turn indicator and a right-turn indicator. Each of the left-turn indicator and the right-turn indicator contained in the emergency lamp 256 may be used to indicate a traveling direction of the vehicle 100. If necessary, both the left-turn indicator and the right-turn indicator are simultaneously and repeatedly blinked through a button of the emergency lamp 256, thereby attracting drivers of peripheral vehicles located close to the vehicle 100. The vehicle 100 according to an embodiment of the present disclosure may use the emergency lamp 256 to generate the passenger confirmation warning message.

A mobile device 258 may be a mobile communication terminal such as a mobile phone carried by the driver of the vehicle 100. The vehicle 100 may transmit a warning message for passenger confirmation to the mobile device 258 carried by the driver.

Figure 3:
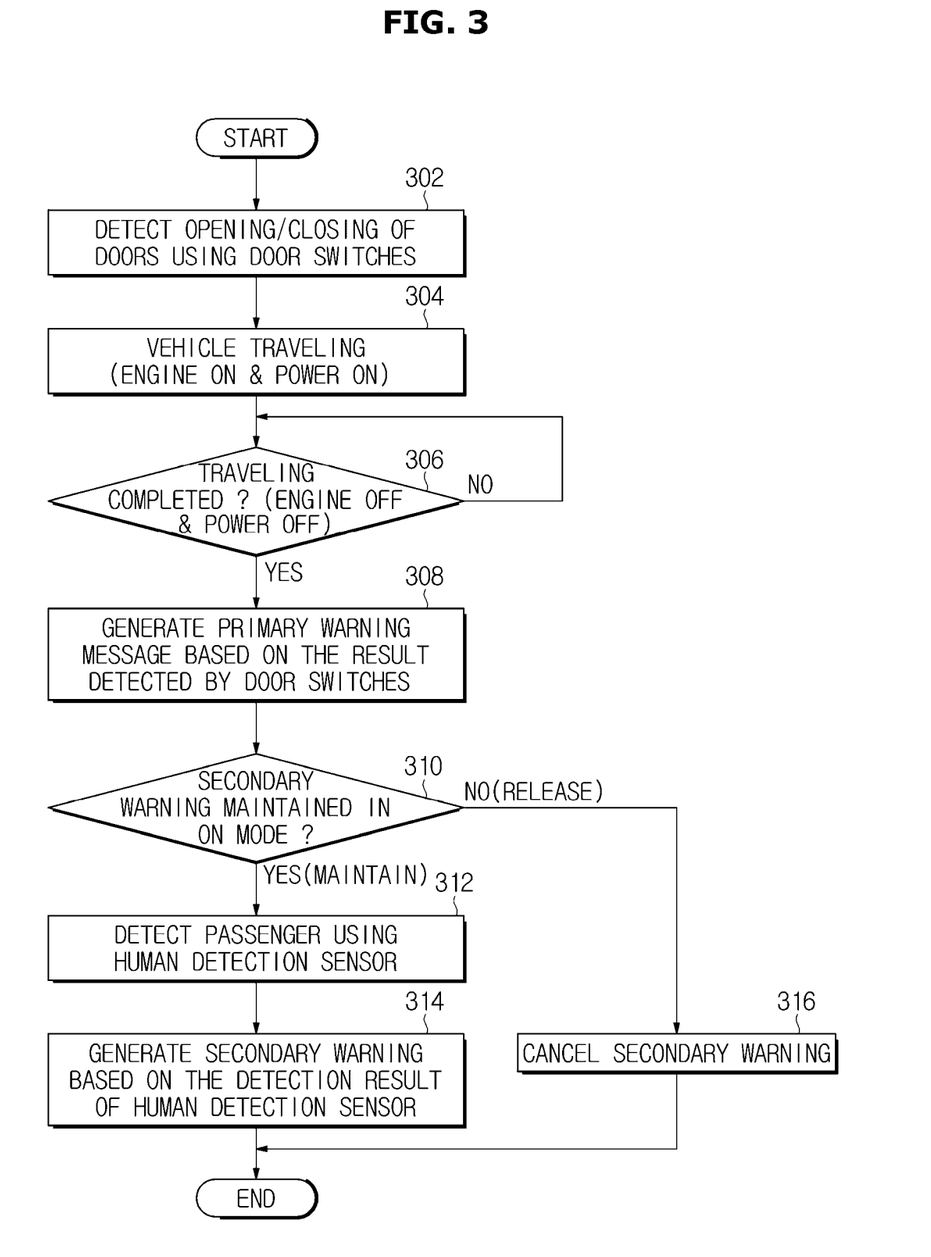
FIG. 3 is a flowchart illustrating a method for controlling a vehicle according to an embodiment of the present disclosure.

FIG. 3 is a flowchart illustrating a method for controlling a vehicle according to an embodiment of the present disclosure. Specifically, FIG. 3 is a flowchart illustrating a method for generating a warning message to guide a vehicle driver to confirm the presence or absence of any passenger remaining in the front and back seats when the driver exits the vehicle.

Referring to FIG. 3, the controller 202 of the vehicle 100 may detect whether the doors 190 and 194 are opened or closed using the door switches 222 and 224 (302). The operation or step 302 for detecting the opening/closing actions of the doors 190 and 194 using the door switches 222 and 224 may be continuously performed even when the vehicle 100 is powered off and parked in a parking lot. The operation 302 for detecting the opening/closing actions of the doors 190 and 194 using the door switches 222 and 224 may be performed as a background task.

The result detected by the door switches 222 and 224, i.e., opening/closing information of the doors 190 and 194, may be stored in the memory 230. The controller 202 may determine whether at least one passenger enters or exits the vehicle 100 upon receiving the opening/closing information stored in the memory 240. For driving of the vehicle 100, the driver must first ride in the vehicle 100. In this case, at least one passenger other than the driver may also be seated in the front or back seats of the vehicle 100 as necessary. The controller 202 may determine whether the driver and the passenger enter or exit the vehicle 100 upon receiving the opening/closing information of the doors 190 and 194 from the door switches 222 and 224.

If the driver rides in the vehicle 100 and begins engine ignition using an ignition switch or key, the engine is started or powered on and a power supply of the vehicle 100 is also turned on (operation 304). The vehicle 100 is then ready to travel on roads.

If the vehicle 100 arrives at a destination and the engine ignition is stopped by the driver of the vehicle 100, the engine and the power supply of the vehicle 100 are turned off (operation 306).

After completion of traveling of the vehicle 100 (Yes in operation 306), the controller 202 may generate a primary warning message for passenger confirmation on the basis of the result detected by the door switches 222 and 224 (operation 308). The primary warning message may be generated in consideration of only the detection result of the door switches 222 and 224. The primary warning message may be implemented by displaying a predetermined message on a display of the vehicle 100, whereby the predetermined message guides the driver of the vehicle 100 to confirm the presence or absence of at least one passenger remaining in the vehicle 100. For example, a warning message for guiding the driver to confirm the presence or absence of any passenger remaining in the vehicle 100 may be displayed on the instrument panel 252 located close to the driver seat of the vehicle 100. Generally, after completion of vehicle traveling, the driver opens the driver-seat door 190 and exits the vehicle 100. In this case, as soon as the driver-seat door 190 is opened, the controller 202 may generate the primary warning message for passenger confirmation.

Figure 4:
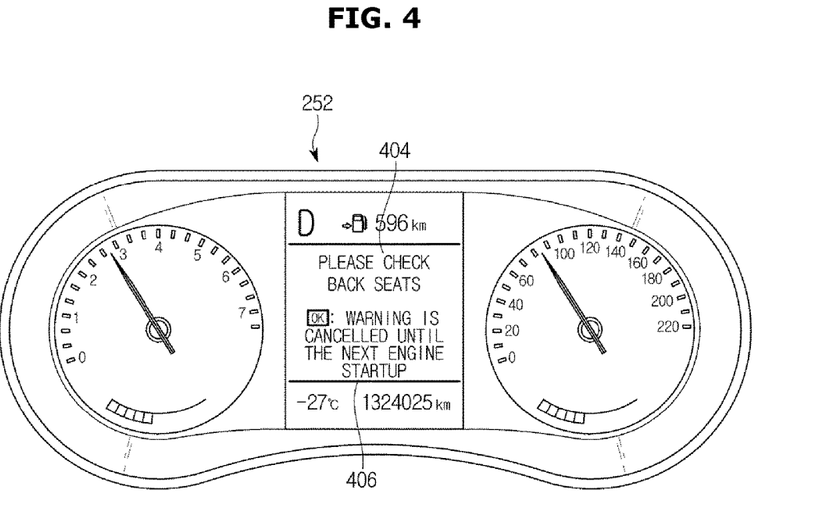
FIG. 4 is a view illustrating a primary warning message for passenger confirmation according to an embodiment of the present disclosure.

FIG. 4 is a view illustrating a primary warning message for passenger confirmation according to an embodiment of the present disclosure. Referring to FIG. 4, a primary warning message 404, for example, "Please check back seats!", may be displayed on the instrument panel 252 of the vehicle 100, so that the driver of the vehicle 100 may confirm the presence or absence of any passenger remaining in the front or back seats of the vehicle 100. The above-mentioned primary warning message may, after the driver parks and exits the vehicle 100, prevent passengers, which are to be protected by an adult driver, for example, infant(s), toddler(s), child(ren), the aged, and/or pet(s), from being unintentionally and unfortunately being left behind or remaining in the vehicle 100. The driver of the vehicle 100 may confirm the presence or absence of a residual passenger remaining in the vehicle 100 by recognizing the primary warning message. As a result, the vehicle 100 according to the present disclosure may prevent a situation where only the driver exits the vehicle 100 alone, without recognizing that other passengers have not yet exited the vehicle 100.

In accordance with an embodiment of the present disclosure, after generation of the primary warning message, a secondary warning message for passenger confirmation may be further generated as necessary or desired. The operation for generating the secondary warning message may be turned on or off by the driver. In more detail, when the secondary warning message is maintained in an ON mode by the driver, the secondary warning message may be generated according to a predetermined condition. When generation of the secondary warning message is cancelled by the driver, the secondary warning message may not be generated on the instrument panel. For this purpose, during generation of the primary warning message, the controller 202 may output an additional message for guiding the driver to select a command for maintaining or cancelling generation of the secondary warning message until reaching a next engine startup time of the vehicle. As illustrated in FIG. 4, a message 406, for example, "OK: Warning is cancelled until the next engine startup", is displayed on the instrument panel of the vehicle, such that generation of the secondary warning message may be maintained or cancelled by selection of the driver. When the driver does not select the OK button 232, generation of the secondary warning message is maintained. When the driver selects the OK button 232, generation of the secondary warning message is cancelled. In the above-mentioned message displayed on the instrument panel 252 (i.e., "OK: Warning is cancelled until the next engine startup."), the term "warning" may refer to secondary warning for passenger confirmation. A method for performing the secondary warning for passenger confirmation is described below with reference to FIG. 5.

Referring back to FIG. 3, when the driver does not select the OK button 232 and maintains the secondary warning message in the ON mode ('YES(maintain)' in operation 310), the controller 202 may determine whether any passenger (i.e., a residual passenger) having not yet exited the vehicle 100 is remaining in the vehicle 100. The controller 202 may make such determination using the human detection sensor 226 so as to generate the secondary warning message (operation 312).

In this case, the secondary warning message may be generated when the presence of the residual passenger remaining in the vehicle 100 is repeatedly detected at least a predetermined number of times during a predetermined time after the driver exits the vehicle 100. For example, when the presence of a residual passenger remaining in the vehicle 100 is detected at least three times within three minutes after the driver exits the vehicle 100, the secondary warning message may be generated. The scope or spirit of the present disclosure is not limited to the examples of three times or three minutes. The predetermined time and the number of times for detecting the presence of the residual passenger may also be set to other values as necessary.

If the presence or absence of the residual passenger is detected using the human detection sensor 226, the controller 202 may generate the secondary warning message upon receiving the detection result from the human detection sensor 226 (operation 314). When the presence of the residual passenger having not yet exited the vehicle 100 is not detected (i.e., when no residual passenger is detected in the vehicle), the controller 202 may not generate the secondary warning message. In contrast, when the presence of the residual passenger having not yet exited the vehicle 100 is detected (i.e., when a residual passenger is detected in the vehicle), the controller 202 may generate the secondary warning message.

Figure 5:
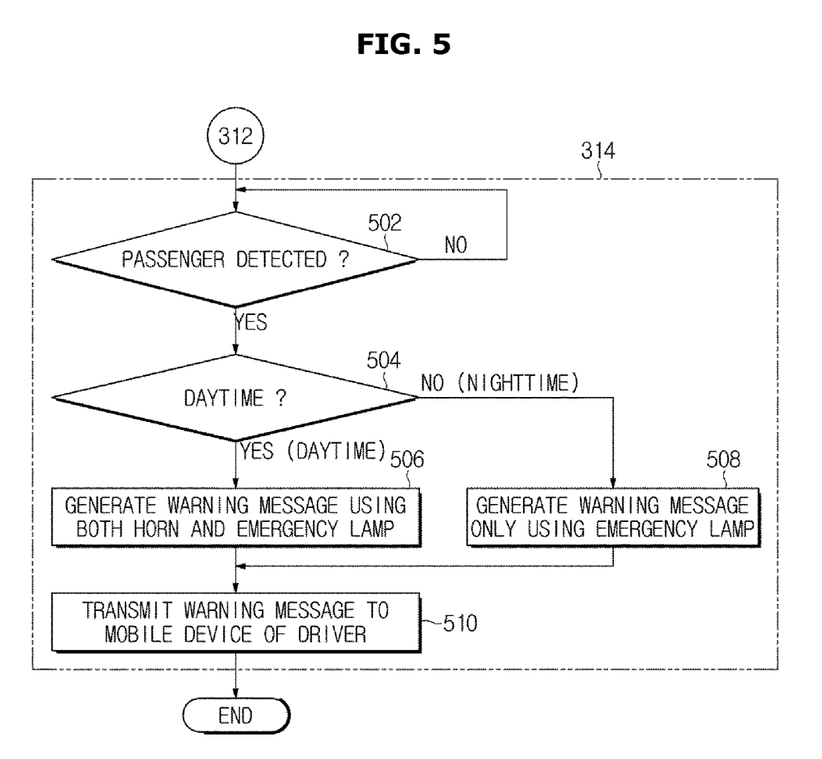
FIG. 5 is a flowchart illustrating a method for generating a secondary warning message for passenger confirmation according to an embodiment of the present disclosure.

FIG. 5 is a flowchart illustrating a method for generating a secondary warning message for passenger confirmation according to an embodiment of the present disclosure.

Referring to FIG. 5, when the presence of another passenger, other than the driver, is detected in the vehicle 100 after the driver exits the vehicle 100 (Yes in operation 502), the controller 202 may determine whether a current time is daytime or nighttime (operation 504). In accordance with an embodiment of the present disclosure, when the secondary warning message is generated, the controller 202 may make a distinction between a daytime mode and a nighttime mode, such that the controller 202 may generate an optimum warning message appropriate for the daytime or nighttime mode. For example, when the secondary warning message is generated during the nighttime, a warning sound signal generated from the vehicle 100 is reduced in volume so as to prevent neighbors or other people from being bothered by excessive noise or sound. The distinction between the daytime and the nighttime may be determined in consideration of a predetermined reference illumination intensity established in the auto-light sensor 228. In one example, the reference illumination intensity may be used to discriminate between the daytime and the nighttime. For example, when a current illumination intensity is appropriate for a turn-on condition of the auto-light sensor 228, a current time may be determined to be the nighttime. When a current illumination intensity is appropriate for a turn-off condition of the auto-light sensor 228, a current time may be determined to be the daytime. In another example, the distinction between the daytime and the nighttime may be determined in consideration of a sunrise time and a sunset time scheduled by a weather forecast. In still another example, the distinction between the daytime and the nighttime may also be determined in consideration of a daytime setting hour and nighttime setting hour established in a navigation system (not shown) by the driver of the vehicle 100.

When the secondary warning message is generated during the daytime ('Yes(daytime)' in operation 504), the controller 202 may perform a warning using both the horn 254 and the emergency lamp 256 (operation 506). For example, the controller 202 may control the horn 254 to audibly generate a warning sound having a predetermined pattern so as to perform an audible warning. At the same time, the controller 202 may control the emergency lamp 256 to blink according to a predetermined pattern so as to perform a visual warning. By execution of the audible warning and the visual warning using the horn 254 and the emergency lamp 256, respectively, the driver of the vehicle 100 may be notified or become aware of the presence of a residual passenger having not yet exited the vehicle 100. The driver is then able to take proper action for the residual passenger remaining in the vehicle 100.

In contrast, when the secondary warning message is generated during the nighttime ('No(nighttime)' in operation 504), the controller 202 may only perform a visual warning using the emergency lamp 256 (operation 508). For example, the controller 202 may control the emergency lamp 256 to blink according to a predetermined pattern so as to perform a visual warning. In more detail, assuming that an audible warning based on the horn 254 is performed during the nighttime, neighbors or other people may be bothered by the excessive sound or noise, so that the visual warning is better than the audible warning during the nighttime. By execution of the visual warning using the emergency lamp 256, the driver of the vehicle 100 may be notified or become aware of the presence of a residual passenger having not yet exited the vehicle 100. The driver may then take proper action for the residual passenger remaining in the vehicle 100.

Before, simultaneously, or after execution of the secondary warning (i.e., daytime warning) using both horn 154 and the emergency lamp 256 or after execution of the secondary warning (i.e., nighttime warning) only using the emergency lamp 256, an additional warning message may be transmitted to the mobile device 258 of the driver (operation 510). Even when the driver does not take action for the residual passenger remaining in the vehicle 100 during generation of the secondary warning message, the vehicle 100 may guide the driver to take proper action for the residual passenger by transmitting the additional warning message to the mobile device 258 of the driver.

Referring back to FIG. 3, when the driver selects the OK button 232 ('NO(release)' in operation 310), the controller 202 may cancel a secondary warning mode (operation 316) based on the secondary warning message. The secondary warning mode is then not performed until the vehicle 100 restarts engine ignition. The driver who selects the OK button 232 has already recognized the presence of passengers remaining in the vehicle 100, and is ready to assist the passengers to safely exit the vehicle 100. In this case, although the driver cancels the secondary warning mode until the vehicle 100 restarts engine ignition, there is no possibility of causing the residual passenger remaining in the vehicle 100. When the vehicle 100 restarts engine ignition, the primary warning mode and the secondary warning mode may be automatically activated or reactivated.

Figure 6:
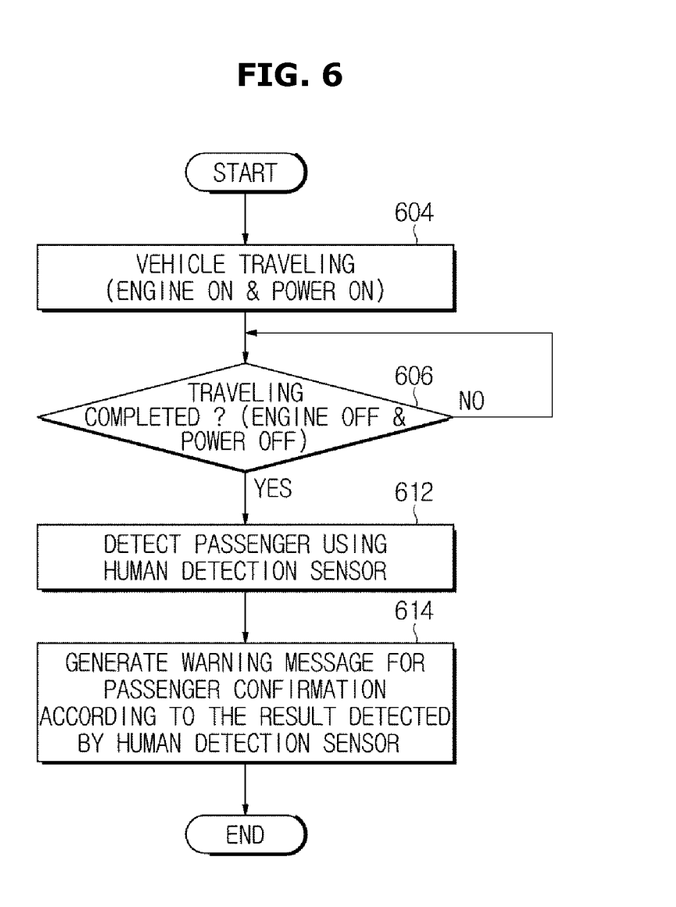
FIG. 6 is a flowchart illustrating a method for controlling a vehicle according to another embodiment of the present disclosure.

FIG. 6 is a flowchart illustrating a method for controlling a vehicle according to another embodiment of the present disclosure. Specifically, FIG. 6 is a flowchart illustrating a method for generating a warning message to guide a driver of the vehicle to confirm the presence or absence of passengers seated on the front or back seats before the driver exits the vehicle. Differently from the warning method of FIG. 3, the warning method of FIG. 6 may include independently generating only one warning message using the result detected by the human detection sensor.

When the driver rides in the vehicle 100 and begins engine ignition using the ignition switch or key, the engine is started or powered on and a power supply of the vehicle 100 is also turned on (operation 604). The vehicle 100 is then ready to travel on roads.

When the vehicle 100 arrives at a destination and the engine ignition is stopped by the driver of the vehicle 100, the engine and the power supply of the vehicle 100 are turned off (operation 606).

In order to generate a warning message for passenger confirmation after completion of traveling of the vehicle 100, the controller 202 may confirm the presence or absence of a residual passenger having not yet exited the vehicle 100 using the human detection sensor 226 (operation 612).

When the presence or absence of the residual passenger is detected by the human detection sensor 226, the controller 202 may or may not generate a warning message for passenger confirmation upon receiving the detection result from the human detection sensor 226 (operation 614). When the residual passenger is not detected in the vehicle 100, the controller 202 may not generate the warning message for passenger confirmation. In contrast, when the residual passenger is detected in the vehicle 100, the controller 202 may generate the warning message for passenger confirmation.

The warning message for passenger confirmation shown in operation 614 of FIG. 6 may be performed in the same manner as in the secondary warning message shown in FIG. 3. In other words, as shown in FIG. 5, the horn 254 and the emergency lamp 256 may be selectively used for warning (operations 506 and 508 in FIG. 5), not only through the determination result of the presence or absence of the residual passenger, but also through the distinction between a daytime and a nighttime condition. The warning message is transmitted to the mobile device 258 so that an additional warning message may be generated (operation 510 in FIG. 5). Generally, after completion of vehicle traveling, the driver parks the vehicle in a parking lot, a parking space, garage, or the like and exits the vehicle by opening the driver-seat door 190. In this case, as soon as the driver-seat door 190 is opened, a warning message for passenger confirmation may be generated (operation 612).

As will be apparent from the above description, the vehicle according to the embodiments of the present disclosure generates a warning message for passenger confirmation. The warning message is to guide a driver of the vehicle to confirm whether at least one passenger alights from the vehicle, such that the vehicle prevents any passenger who has not yet exited the vehicle from being unintentionally or unfortunately left behind or remaining alone in the vehicle.

Although several embodiments of the present disclosure have been shown and described, it should be appreciated by those having ordinary skill in the art that changes may be made in these embodiments without departing from the principles and spirit of the disclosure, the scope of which is defined in the claims and their equivalents.

What is claimed is:

1. A method for controlling a vehicle, the method comprising:
   primarily confirming a presence or absence of a passenger having not yet exited the vehicle on a basis of opening/closing information of doors;
   generating a primary warning message for passenger confirmation on a basis of a result of the primary confirmation regarding the presence or absence of the passenger;
   secondarily confirming the presence or absence of the passenger having not yet exited the vehicle using a human detection sensor; and
   generating a secondary warning message for passenger confirmation on a basis of a result of the secondary confirmation,
   wherein when the primary warning message is generated, maintenance or cancellation of the secondary warning message is selected and generation or non-generation of the secondary warning message is decided according to the selection result of the maintenance or cancellation of the secondary warning message.

2. The method according to claim 1, wherein the generating the secondary warning message includes:
   generating the secondary warning message when the presence of the passenger having not yet exited the vehicle is repeatedly detected a predetermined number of times within a predetermined time after a driver of the vehicle exits the vehicle.

3. The method according to claim 2, further comprising:
   when the secondary warning message is generated in a daytime, generating the secondary warning message using an audible warning and using visual warning; and
   when the secondary warning message is generated in a nighttime, generating the secondary warning message only using the visual warning.

4. The method according to claim 3, wherein:
   the visual warning includes blinking an emergency lamp of the vehicle; and
   the audible warning includes honking a horn of the vehicle.

5. The method according to claim 1, wherein the human detection sensor includes at least one of a motion sensor, a weight sensor, and a pressure sensor configured to detect the presence or absence of the passenger remaining in the vehicle.

6. The method according to claim 5, wherein the motion sensor includes at least one of an ultrasonic sensor, an infrared sensor, a vision sensor, a radar sensor, and a LiDAR (Light Detection And Ranging) sensor.

7. The method according to claim 1, wherein the secondary warning message includes:
   transmitting a message for passenger confirmation to a mobile device of a driver of the vehicle.

8. A vehicle comprising:
   a door switch configured to detect opening or closing of a door of the vehicle;
   a human detection sensor configured to detect a presence or absence of a human body; and
   a controller configured to generate a primary warning message according to a passenger confirmation result based on the opening or closing information of the door, and to generate a secondary warning message according to a passenger confirmation result detected by the human detection sensor,
   wherein when the primary warning message is generated, maintenance or cancellation of the secondary warning message is selected and generation or non-generation of the secondary warning message is decided according to the selection result of the maintenance or cancellation of the secondary warning message.

9. The vehicle according to claim 8, wherein:
   the secondary warning message is generated when the presence of the passenger having not yet exited the vehicle is repeatedly detected a predetermined number of times within a predetermined time after a driver of the vehicle exits the vehicle.

10. The vehicle according to claim 9, wherein:
    when the secondary warning message is generated in a daytime, the controller generates the secondary warning message using an audible warning and using visual warning; and
    when the secondary warning message is generated in a nighttime, the controller generates the secondary warning message only using the visual warning.

11. The vehicle according to claim 10, wherein:
    the visual warning includes blinking an emergency lamp of the vehicle; and
    the audible warning includes honking a horn of the vehicle.

12. The vehicle according to claim 8, wherein the human detection sensor includes at least one of a motion sensor, a weight sensor, and a pressure sensor configured to detect the presence or absence of the passenger remaining in the vehicle.

13. The vehicle according to claim 12, wherein the motion sensor includes at least one of an ultrasonic sensor, an infrared sensor, a vision sensor, a radar sensor, and a LiDAR (Light Detection And Ranging) sensor.

14. The vehicle according to claim 8, wherein the secondary warning message transmits a message for passenger confirmation to a mobile device of a driver of the vehicle.

15. A method for controlling a vehicle comprising:
    confirming a presence or absence of a passenger having not yet exited the vehicle using a human detection sensor; and
    generating a primary warning message and a secondary warning message for passenger confirmation on a basis of the confirmation result regarding the presence or absence of the passenger,
    wherein when the primary warning message is generated, maintenance or cancellation of the secondary warning message is selected and generation or non-generation of the secondary warning message is decided according to the selection result of the maintenance or cancellation of the secondary warning message.

16. The method according to claim 15, wherein the generating the warning message for passenger confirmation includes:
    generating the secondary warning message when the presence of the passenger having not yet exited the vehicle is repeatedly detected a predetermined number of times within a predetermined time after a driver of the vehicle exits the vehicle.

17. The method according to claim 16, further comprising:
    generating the primary warning message and the secondary warning message using an audible warning and using a visual warning in a daytime; and
    generating the primary warning message and the secondary warning message only using the visual warning in a nighttime.

18. The method according to claim 17, wherein:
the visual warning includes blinking an emergency lamp of the vehicle; and
the audible warning includes honking a horn of the vehicle.

\* \* \* \* \*